(12) United States Patent
Greening et al.

(10) Patent No.: US 7,333,209 B2
(45) Date of Patent: Feb. 19, 2008

(54) FIBER OPTIC GYROSCOPE ASYNCHRONOUS DEMODULATION

(75) Inventors: Thomas C. Greening, Peoria, AZ (US);
Charles H. Lange, Glendale, AZ (US);
Chung-Jen Chen, Phoenix, AZ (US)

(73) Assignee: Honeywell International, Inc., Morristown, NJ (US)

( * ) Notice: Subject to any disclaimer, the term of this patent is extended or adjusted under 35 U.S.C. 154(b) by 96 days.

(21) Appl. No.: 11/271,994

(22) Filed: Nov. 9, 2005

(65) Prior Publication Data
US 2007/0103691 A1    May 10, 2007

(51) Int. Cl.
*G01C 19/72* (2006.01)
(52) U.S. Cl. ..................................... 356/464
(58) Field of Classification Search ............... 356/460, 356/464
See application file for complete search history.

(56) References Cited

U.S. PATENT DOCUMENTS

| | | | |
|---|---|---|---|
| 4,848,910 A * | 7/1989 | Dupraz ....................... 356/460 |
| 5,080,489 A | 1/1992 | Nishikawa et al. |
| 5,196,904 A | 3/1993 | Dane et al. |
| 5,264,914 A * | 11/1993 | Oho et al. ................... 356/460 |
| 5,708,687 A * | 1/1998 | Powell et al. ............... 375/376 |
| 6,028,668 A | 2/2000 | Rider |
| 6,744,966 B2 | 6/2004 | Ang et al. |
| 6,765,678 B2 | 7/2004 | Strandjord et al. |
| 6,778,279 B2 | 8/2004 | Lange et al. |
| 2003/0169428 A1 | 9/2003 | Lange |
| 2004/0233456 A1 * | 11/2004 | Standjord et al. ........... 356/464 |

FOREIGN PATENT DOCUMENTS

| | | |
|---|---|---|
| DE | 42082567 A1 | 9/1993 |
| EP | 0612981 A1 | 8/1994 |
| WO | WO 02/06770 A1 | 1/2002 |

OTHER PUBLICATIONS

Rodriguez et al, Zero-Crossing Demodulator for Open Loop Fiber Optic Gyroscopes, SBMO/IEEE MTT-S IMOC Proceedings, 2001, pp. 149-152.*
EP Search Report, 06123654.3, dated Oct. 5, 2007.
Bohm et al, Direct Rotation-Rate Detection With a Fibre-Optic Gyro by Using Digital Data Processing, 1983 Institution of Electrical Engineers, vol. 19 (23), 997-999 (1983).

* cited by examiner

*Primary Examiner*—Samuel A. Turner
(74) *Attorney, Agent, or Firm*—Ingrassia, Fisher & Lorenz, P.C.

(57) ABSTRACT

A clock system for a fiber optic gyroscope is provided that includes a highly-tunable clock for the bias modulation and a separate asynchronous high-speed clock for the photodetector sampling. By separating the two clocks rather than using two derivatives of the same clock, the clock system and method can provide both the tunability objective of the bias modulation clock and the high-speed objective of the sampling clock, while using readily available, lower performance, radiation-hardened electronics parts.

19 Claims, 4 Drawing Sheets

FIBER OPTIC GYROSCOPE ASYNCHRONOUS DEMODULATION

STATEMENT REGARDING FEDERALLY SPONSORED RESEARCH OR DEVELOPMENT

This invention was made with Government support under Contract N0030-04-C-0010 awarded by the Department of the Navy and under Contract F29601-03-0124 awarded by the Air Force Research Lab. The Government has certain rights in this invention.

FIELD OF THE INVENTION

This invention generally relates to fiber optic gyroscopes, and more specifically relates to timing in fiber optic gyroscopes.

BACKGROUND OF THE INVENTION

Fiber optic gyroscopes are used to accurately sense rotation of an object supporting such a gyroscope. Fiber optic gyroscopes can be made quite small and can be constructed to withstand considerable mechanical shock, temperature change, and other environmental extremes. Due to the absence of moving parts, they can be nearly maintenance free. Furthermore, they can be highly sensitive to very low rotation rates that can be a problem in other kinds of optical gyroscopes.

A typical fiber optic gyroscope includes a coiled optical fiber wound on a core and about the axis around which rotation is to be sensed. The optical fiber provides a closed optical path in which an electromagnetic wave is introduced and split into a pair of waves that propagate in opposite directions and ultimately impinge on a photodetector. During use, a rotation about the sensing axis of the core provides an effective optical path length increase in one rotational direction, and an optical path length decrease in the other rotational direction. The resulting path length difference results in a phase shift between the waves propagating in opposite directions. This result is generally referred to as the Sagnac effect. In a fiber optic gyroscope, the phase shift resulting from the Sagnac effect is used to determine rotation around the axis. Specifically, waves propagating in opposite directions interfere when recombined and impinge upon photodetector, which measure the intensity of the combined wave. The output of the photodetector, which is a measure of the amount of interference, is used to determine the phase difference in the counter-propagating beams, and thus is used to determine rotation around the axis.

In many fiber optic gyroscopes, the traveling electromagnetic waves are modulated by placing an optical phase modulator in the optical path on one or both sides of the coiled optical fiber. This modulation is used to overcome directional ambiguity by introducing a phase shift to the incoming and outgoing waves in the optical fiber. As one example, the phase modulation is achieved by applying a modulating signal across the electrodes of the optical phase modulator. Typically, the modulating signal is a square wave with a period equal to twice the transit time of the light through the coil. The modulating signal causes the photodetector to measure the intensity at two different points in the raised cosine interferogram. The rotation rate and direction can then be determined by the difference in the emitted intensity at the two different measured points.

In order to achieve a high level of performance, the bias modulation frequency should equal the proper frequency of the fiber optic gyroscope sensing coil. The proper frequency is typically the frequency that results in the modulation of one of the counter-propagating waves 180 degrees out of phase with the modulation of the other. The value of the proper frequency can be determined from the length of the optical fiber and the equivalent refractive index thereof. By modulating at the proper frequency, quadrature type errors are nearly eliminated. Quadrature errors are unwanted signals that are synchronous with the desired rate signal but are 90 degrees out of phase with the rate signal. The two most common and significant quadrature errors in an fiber optic gyroscope are due to intensity modulation and second harmonic phase modulation (or any even harmonics) generated by the bias phase modulation. Both of these error mechanisms generate an optical signal at the photodetector, which is 90 degrees out of phase with the desired rotation rate signal. The quadrature error signals go to zero when the bias modulation frequency is adjusted to the proper frequency of the sensing coil. As a consequence it is highly desirable for a high performance fiber optic gyroscope to generate the bias modulation at the proper frequency. Furthermore, it is desirable that the clock used to generate the bias modulation frequency be tunable to account for coil length variance or to implement temperature-dependent proper frequency compensation or a proper frequency servo.

In addition to generating a tunable clock to control the bias modulation, a typical fiber optic gyroscope uses a high frequency clock to sample the photodetector signal. When sampling the photodetector signal, the samples at the beginning of each bias modulation period are usually rejected to eliminate the bias modulation glitch. A bias modulation glitch is generated when the bias modulation frequency does not equal the proper frequency. For the difference in time between the change in bias modulation and the loop transit time, both counter-propagating waves are equally phase shifted producing little interference when recombined. For this time period, a rate insensitive large photodetector signal or glitch is created with a width proportional to the timing difference. Even if the bias modulation exactly equals the proper frequency, a bias modulation glitch can arise from the finite time it takes to modulate from one point of the interferogram to another, caused by the slew limit of the bias modulation drive signal. Anti-aliasing filters, with a frequency typically set to half of the photodetector sampling frequency, are used to prevent high frequency noise from aliasing to the demodulation frequency, causing an increase in noise of the measured rotation rate. These same anti-aliasing filters also spread the bias modulation glitches creating the need to reject the photodetector samples significantly contaminated by the glitch. The larger the fraction of the rejected samples, the larger the measured noise. By sampling the photodetector signal at a higher frequency, the anti-aliasing filter frequency can be set higher, decreasing the amount of glitch spreading. With less glitch spreading, fewer samples need to be rejected, resulting in improved noise performance. Therefore, for best noise performance, a higher photodetector sampling frequency is preferred.

Figure 7:
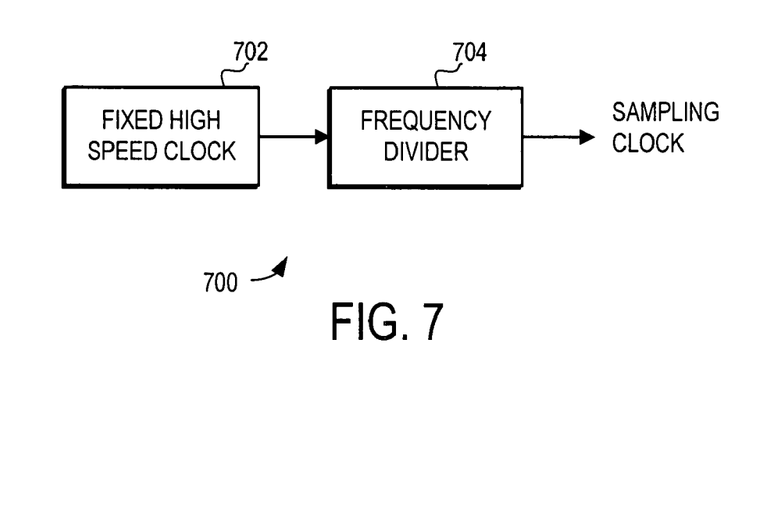
FIG. 7 is a schematic view of an exemplary sampling clock generator in accordance with an embodiment of the invention.

Turning now to FIG. 7, an embodiment of a high speed sampling clock generator Previous timing methods have provided a single tunable high-frequency clock from which both the bias modulation clock and the photodetector sampling clock are derived. These methods have typically relied upon high frequency tunable clock circuits that may not be available in all applications. For example, in applications where radiation hardening is required (e.g. some space applications), the number and type of tunable high frequency circuits that are available for use is severely limited.

Thus, what is needed is a system and method for generating a highly tunable clock for the proper frequency and a high-speed clock for the photodetector sampling converter that do not require unattainable radiation-hardened high speed devices.

BRIEF SUMMARY OF THE INVENTION

The present invention provides a clock system and method for a fiber optic gyroscope that includes a highly-tunable clock for the bias modulation and a separate asynchronous high-speed clock for the photodetector sampling. By separating the two clocks rather than using two derivatives of the same clock, the clock system and method can provide both the tunability objective of the bias modulation clock and the high-speed objective of the sampling clock, while using readily available, lower performance, radiation-hardened electronics parts.

The preferred embodiment system for creating the tunable low-speed clock for the bias modulation uses a direct digital synthesis (DDS) circuit. A DDS circuit is comprised of a digital sine wave generator, a digital-to-analog converter (DAC), an analog filter, and a comparator. Specifically, the digital sine wave generator creates a digital sine wave at a precisely controllable frequency. The digital sine wave is then converted to an analog sine wave by the DAC. The DAC generated sine wave is then passed through a low pass filter. The filtered output, now comprised almost entirely of the desired frequency, is passed to a comparator. The output of the comparator is then a clock signal with a highly tunable frequency and thus is suitable for use as a bias modulation clock in a fiber optic gyroscope. Additionally, the DDS can be implemented with relatively low frequency electronic components. This facilitates the use of radiation hardened electronic components that are typically only available at lower performance levels than non-radiation hardened components.

In addition to the bias modulation clock, the preferred embodiment separately generates a relatively high-speed sampling clock. The high-speed sampling clock is preferably generated by dividing down a fixed-frequency high speed clock. For example, a fixed-frequency clock from a crystal oscillator can be divided down to the sampling frequency of the analog-to-digital converter. Because the sampling clock is generated by dividing down the fixed-frequency high speed clock, it can be provided using radiation hardened electronic components.

To measure rate, the photodetector signal is demodulated at the bias modulation frequency by aligning the sampling clock with the transitions of the bias modulation clock. Samples are then taken based on the sample clock frequency until a predetermined number of samples have been taken. When the predetermined number of samples has been taken, no further samples are taken until the next appropriate transition of the bias modulation clock.

The present invention thus provides a clock system and method that can achieve both the tunability objective of the bias modulation clock and the high-speed objective of the sampling clock, while using readily available, lower performance, radiation-hardened electronics parts.

BRIEF DESCRIPTION OF DRAWINGS

The preferred exemplary embodiment of the present invention will hereinafter be described in conjunction with the appended drawings, where like designations denote like elements, and.

DETAILED DESCRIPTION OF THE INVENTION

The present invention provides a clock system and method for a fiber optic gyroscope that includes a highly-tunable clock for the bias modulation and a separate asynchronous high-speed clock for the photodetector sampling. By separating the two clocks rather than using two derivatives of the same clock, the clock system and method can provide both the tunability objective of the bias modulation clock and the high-speed objective of the sampling clock, while using readily available, lower performance, radiation-hardened electronics parts.

The preferred embodiment system for creating the tunable low-speed clock for the bias modulation uses a direct digital synthesis (DDS) circuit. A DDS circuit is comprised of a digital sine wave generator, a digital-to-analog converter (DAC), an analog filter, and a comparator. The DDS circuit generates a clock signal with a highly tunable frequency and thus is suitable for use as a bias modulation clock in a fiber optic gyroscope. In addition to the bias modulation clock, the preferred embodiment separately generates a relatively high-speed sampling clock. The high-speed sampling clock is preferably generated by dividing down a fixed-frequency high speed clock. The present invention thus provides a clock system and method that can achieve both the tunability objective of the bias modulation clock and the high-speed objective of the sampling clock, while using readily available, lower performance, radiation-hardened electronics parts.

Fiber optic gyroscopes can sense rotation of an object supporting the fiber optic gyroscope. Such gyroscopes can be made quite small and can be constructed to withstand considerable mechanical shock, temperature change, and other environmental extremes. Due to the absence of significant moving parts they can be nearly maintenance free. They can also be sensitive to low rotation rates that are difficult to detect in other kinds of gyroscopes.

Figure 1:
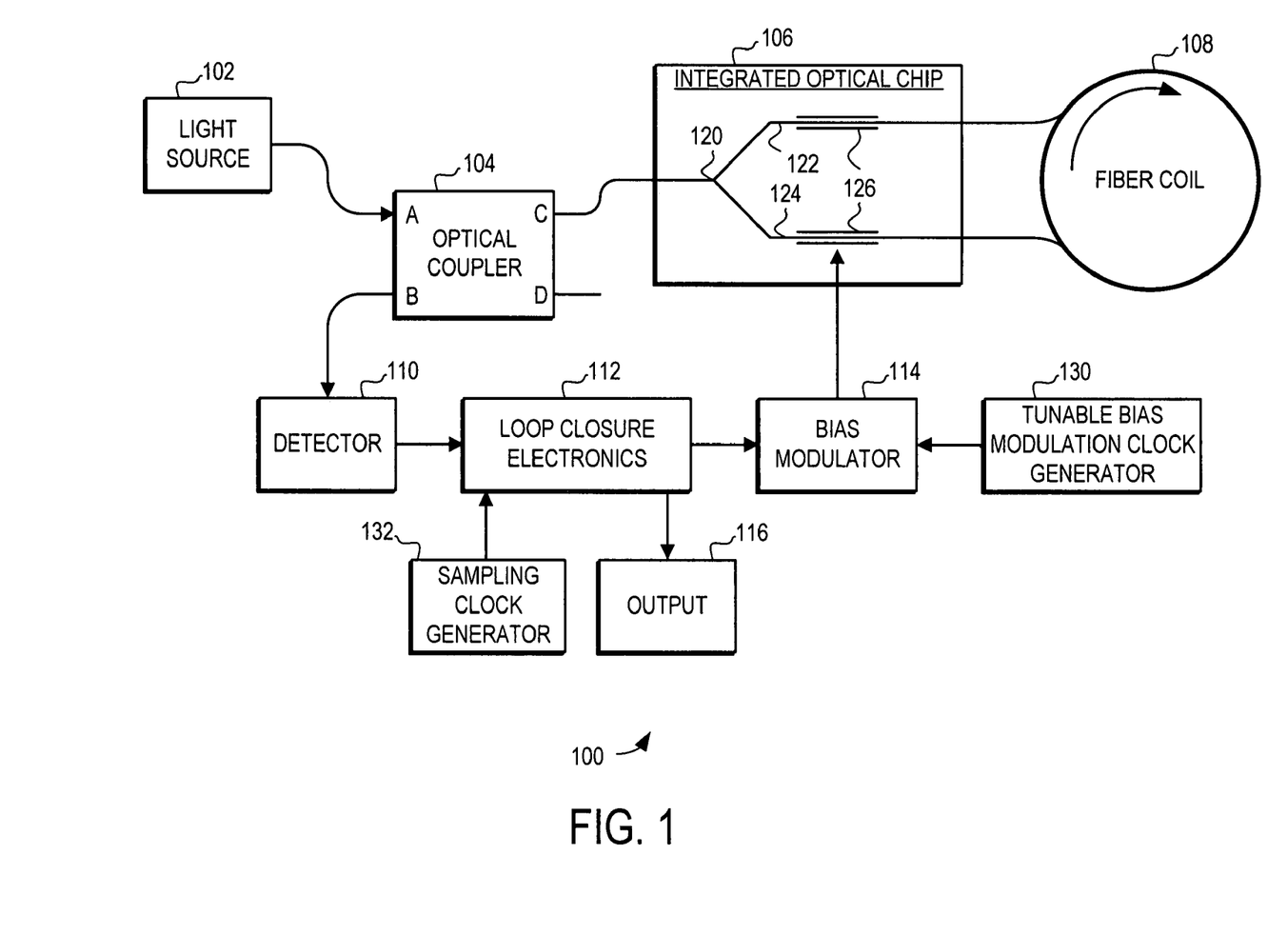
FIG. 1 is a schematic view of an exemplary fiber optic gyroscope in accordance with an embodiment of the invention.

Turning now to FIG. 1, an exemplary interferometric fiber optic gyroscope (IFOG) 100 is illustrated schematically. The IFOG 100 includes a light source 102, an optical coupler 104, an integrated optical chip 106, a fiber optic coil 108, a detector 110, loop closure electronics 112, and a bias modulator 114. Additionally, the IFOG 100 includes a sampling clock generator 132 and a tunable bias modulation clock generator 130 that are part of a clock system that can achieve both the tunability objective for bias modulation and the high-speed objective for sampling, while using readily available, lower performance, radiation-hardened electronics parts It should be noted that the IFOG 100 is merely exemplary of the type of IFOGs that the clock system can be implemented in, and that other suitable implantations can include other combinations of elements.

The fiber optic coil 108 is typically wound around a core and about an axis around which rotation is sensed. The fiber optic coil 108 is typically long, on the order of between 50 and 2000 meters. The fiber optic coil provides the closed optical path in which an electromagnetic wave is split and propagates in opposite directions, ultimately impinging on the detector 110. Rotation about the sensing axis in one direction causes an effective increase in the optical path length for one direction, and a decrease in the optical path length in the other direction. The path length difference introduces a phase shift between the waves, a result known as the Sagnac effect.

The coiling of optical fiber in the fiber optic coil 108 is desirable because the amount of phase shift due to rotation is dependent on the length of the entire optical path through the coil traversed by the two waves traveling in opposite directions. Therefore, a large phase difference can be obtained in a long optical fiber that occupies a relatively small volume as a result of being coiled.

The light source 102 provides the light that propagates through the IFOG 100. The light source 102 can be any suitable light source for propagating electromagnetic waves through the fiber optics system 100. For example, the light source 102 can comprise pump laser that includes a semiconductor super luminescent diode. Alternatively, the light source can comprise a rare earth doped fiber light source. Generally, it is desirable that the light source provide a stable output of a selected wavelength with relatively high efficiency.

The light source 102 is connected to the optical coupler 104 using a suitable optical path, typically comprising optical fibers. The optical coupler 104, sometimes referred to as a fiber coupler, optical light beam coupler or wave combiner and splitter, has light transmission media which extend between four ports A, B, C and D. Port A is connected to the light source 102, port B is connected to the detector 110, and port C is coupled to the integrated optical chip 106.

In general, when the optical coupler 104 receives electromagnetic waves at any of its ports, the optical coupler 104 transmits the waves such that approximately half of the transmitted light appears at each of the two ports on the opposite end of the incoming port. At same time, substantially no electromagnetic waves are transmitted to the port which is at the same end as the incoming port. For example, light received at port A will be transmitted to ports C and D, but will not be substantially transmitted to port B. Similarly, waves received at port C will be transmitted to ports A and B, but not to port D, and so on.

Therefore, during operation light source 102 transmits light to port A of the optical coupler 104. Optical coupler 104 splits the transmitted light and provides the light to ports C and D. The light transmitted to port C is further transmitted to the integrated optical chip 106 via optical fiber or other suitable mechanism.

It should be noted that while the IFOG 100 illustrates the use of an optical coupler 104, that other embodiments of the invention could use different devices in place of the coupler 104. For example, in some fiber optic gyroscope implementations a circulator would be used instead of an optical coupler.

The integrated optical chip 106 includes a Y-junction 120 and waveguides 122 and 124. Additionally, integrated optical chip 106 includes an optical phase modulator electrodes 126 integrated with the waveguides 122 and 124. Again, it should be noted that while IFOG 100 uses an integrated optical chip, that other embodiments of the invention could use other devices. For example, a separate Y-junction or coupler could be used along with a separate modulator.

Inside the integrated optical chip 106 the light is further split at the Y-junction 120 and provided to waveguides 122 and 124. The light provided to wave guide 122 is transmitted to the fiber coil 108, where it propagates clockwise around the length of the fiber coil 108. This light, referred to as the "cw wave", returns to wave guide 124 in the integrated optical chip 106 after propagating through the fiber coil 108. Likewise, the light wave provided to wave guide 124 is transmitted to the fiber coil 108, where it propagates counter-clockwise around the length of the fiber coil 108. This light, referred to as the "ccw wave", returns to wave guide 122 in the integrated optical chip 106 after propagating though the fiber coil 108.

After being transmitted from the fiber coil 108 and passing through their respective wave guides, the cw and ccw waves are combined at the Y-junction 120 and propagate to port C of the optical coupler 104. The combined wave is then split and output at ports A and B. Port B is optically coupled to the detector 110 such that the cw and ccw waves are received at the detector 110. The detector 110 typically comprises a photodetector, such as an appropriate photodiode and a suitable amplifier. Of course, other suitable detectors can be used. When the combined wave arrives at the detector 110, the detector 110 provides an output current proportional to the intensity of the two waves impinging on the photodetector 110.

The output of the detector 110 is passed to the loop closure electronics 112. In general, the loop closure electronics 112 receives the current from the detector 110 and drives the integrated optical chip 106 to a feedback phase shift needed to keep a difference in intensity for two measurements of the interferometer zero. Thus, the rotation rate measurement can be calculated from the feedback phase and delivered as output 116. It should be noted that while the IFOG 100 illustrates the of closed loop operation of the gyroscope, other embodiments of the invention could use other implementations, such as open loop fiber optic gyroscopes that measure rotation directly from the demodulated photodetector signal.

Figure 2:
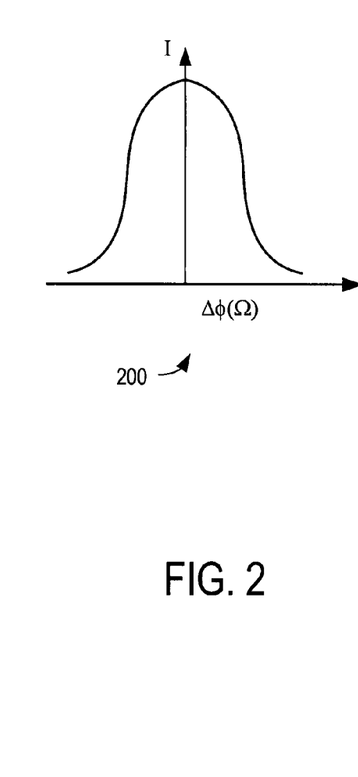
FIGS. 2-5 are exemplary graphical views of cosine interferometer patterns from counter-propagating waves

When the two counter propagating waves impinge on the detector 110, the output from the detector 110 follows the cosine of the phase difference between the two waves. Turning now to FIG. 2, a graph 200 illustrates the cosine of the phase difference between two exemplary waves impinging on the detector. The pattern illustrated in graph 200 is generally referred to as an interferometer pattern. Since the cosine is an even function, such an output function does not give an indication as to the relative direction of the phase shift. Because of this, the phase difference between the two counter-propagating waves are typically modulated, a process generally referred to as bias modulation.

Figure 3:
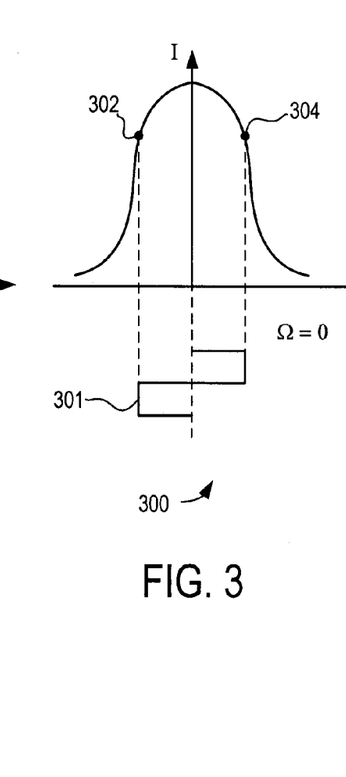
Figure 4:
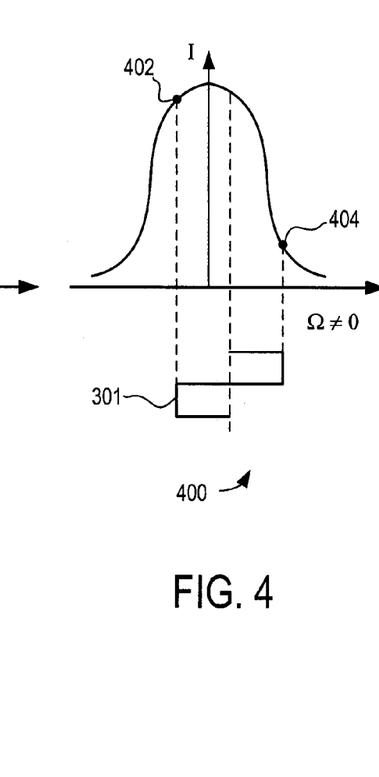

The bias modulator 114 introduces a phase bias modulation by applying a phase shift to the incoming and outgoing waves in the integrated optical chip 106. This modulation is achieved by applying a modulating voltage across electrodes 126 around the wave guides 122 and 124. The application of voltage lengthens or shortens the effective optical path length, thereby introducing an optical phase shift proportional to the applied voltage. Typically, the bias modulator 114 applies a square with a half period equal to the transit time of the light through the coil. The bias modulation causes the detection points in the interferometer to shift, such that the detector 110 no longer measures the intensity at the top of the interferometer, but rather at two offset points. The rotation rate, measured at the detector 110, is then proportional to the difference in the emitted intensity at the two offset points. Turning now to FIGS. 3 and 4, graphs 300 and 400 illustrate bias modulation on the interferometer pattern. Specifically, graph 300 illustrates how a square wave bias modulation signal 301 causes the detector to measure the difference in emitted intensity at offset points 302 and 304. Thus, the rotation rate is now proportional to the difference in the emitted intensity at points 302 and 304. In graph 300, there is no rotation ($\Omega=0$) and the difference in emitted intensity at points 302 and 304 is zero. In graph 400, there is rotation ($\Omega \neq 0$) and thus the difference in emitted intensity between points 402 and 404 is non-zero.

In the preferred embodiment, the bias modulation signal $\phi_M$ is frequency-tunable square wave with an amplitude of $\pm\beta/2 \cdot V\pi$, where $\beta$ is the modulation depth and $V\pi$ is the voltage required to induce a $\pi$ radian phase shift in the integrated optical chip 106. The modulation depth, $\beta$, is typically selected to reduce random angle walk. The period of the bias modulation signal is tunable to half of the loop transit time of the light through the coil, such that the counter-propagating wave encounters the opposite modulation as the outgoing wave when it returns to the integrated optical chip 106. When implemented such a modulation scheme phase advances the incoming wave and retards the outgoing wave, such that the two waves interfere when combined at the Y-junction 120.

As stated above, to achieve a high level of performance, the bias modulation signal is made frequency tunable such that the period of the modulation signal can be made equal to twice the transit time of light through the fiber optic coil 108. The frequency of the bias modulation signal is controlled by the tunable bias modulation clock generator 130. The tunable bias modulation clock generator 130 provides a clock signal with a frequency configured to cause the modulation of one of the counter-propagating waves to be 180 degrees out of phase with the modulation of the other. The tunable bias modulation clock generator 130 allows the frequency to be accurately adjusted to compensate for variations in length of the optical fiber and the equivalent refractive index thereof. A detailed example of how tunable bias modulation clock generator 130 can generate the bias modulation clock will be discussed below.

Figure 5:
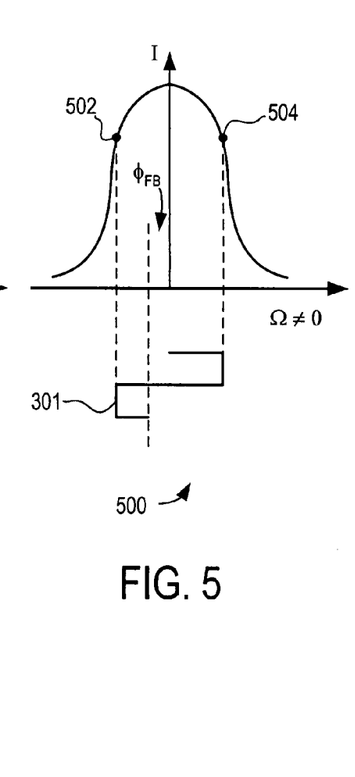

As stated above, in closed loop operation, the loop closure electronics 112 drives the integrated optical chip 106 to keep the difference in emitted intensity at the two offset measuring points zero. Thus, the rotation rate measurement can be calculated from the feedback phase and delivered as output 116. Turning now to FIG. 5, graph 500 illustrates how a feedback phase shift $\phi_{FB}$, equal and opposite to the rotation-induced phase shift, is introduced drive the difference in intensity at points 502 and 504 to zero. Thus, the rotation rate measurement can be calculated from the feedback phase shift $\phi_{FB}$. Specifically, the loop closure electronics can integrate the measured feedback phase shift $\phi_{FB}$ to obtain a value proportional to the rotated angle. The rotated angle can then calculated by multiplying the accumulated phase by a scaling factor.

Closed loop operation has many advantages over open loop operation. For example, by biasing to the same place on the raised cosine interferometer the output is extraordinarily linear and stable. Additionally, because the output 116 is derived from a measurement of phase, the output does not depend on the total intensity of measurements at the detector, which could vary in response to changes in temperature, radiation, vibration and electronics gain.

For a constant rotation rate, the feedback modulation needed to close the rate servo would be a continually increasing ramp. The loop closure electronics 112 amplification circuitry is limited by its output range. To circumvent this problem, a voltage corresponding to a phase change of $2\pi$ is added or subtracted to the feedback modulation, when the feedback modulation voltage nears the IOC 106 drive voltage limit.

As described above, the detector 110 receives the waves from the optical coupler 104 and provides an output current proportional to the intensity of the two waves. The output of the detector is passed to the loop closure electronics 112. The loop closure electronics 112 samples the output of the detector 110 to determine the intensity of the two waves. The sampling of the detector 110 output is controlled by a sampling clock, which is created by the sampling clock generator 132. The sampling clock is selected to have a frequency that will result in the desired number of samples per half-period of the bias modulation clock. As will be described in greater detail below, the sampling clock is preferably generated by dividing down a fixed-frequency high speed clock. For example, a fixed-frequency clock from a crystal oscillator can be divided down to the sampling frequency of the analog-to-digital converter. Because the sampling clock is generated by dividing down fixed-frequency high speed clock, it can be provided using radiation hardened electronic components.

The IFOG 100 thus includes a highly-tunable low-speed clock for bias modulation and a separate non-tunable high-speed clock for the photodetector sampling. By separating the two clocks rather than using two derivatives of the same clock, one can achieve both the tunability objective of the bias modulation clock and the high-speed objective of the photodetector sampling clock, while using readily available, lower performance, radiation-hardened electronics parts.

Figure 6:
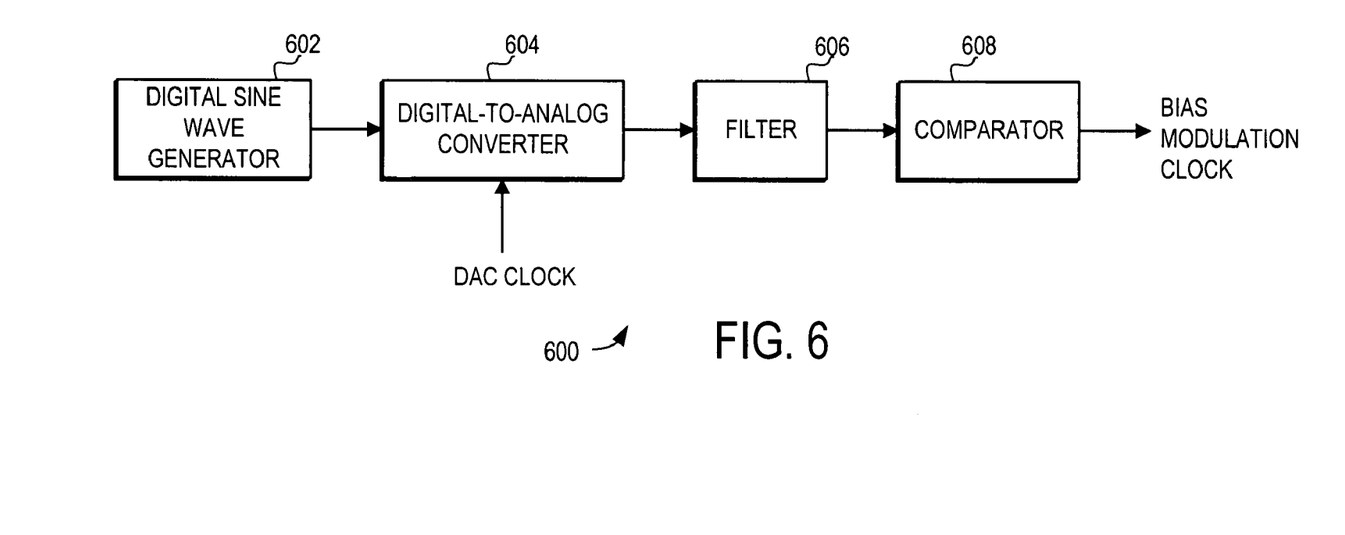
FIG. 6 is a schematic view of an exemplary bias modulation clock generator in accordance with an embodiment of the invention.

Turning now to FIG. 6, an embodiment of tunable bias modulation clock generator 600 is illustrated. This embodiment for creating the tunable low-speed bias modulation clock is created using a direct digital synthesis (DDS) circuit. Specifically, the tunable low-speed bias modulation clock comprises a digital sine wave generator 602, a digital-to-analog converter (DAC) 604, a filter 606, and a comparator 608. The digital sine wave generator 602 creates a digital sine wave at a precisely controllable frequency. The frequency at which the digital sine wave is generated would typically be adaptively controlled. For example, by accumulating an input phase step and using the rollover frequency of the accumulator as the desired frequency of the digital sine wave. Of course, other suitable techniques can be used. The digital sine wave is then converted to an analog signal by a DAC 602, which is clocked with a fixed frequency clock that is preferably at least four times greater than the frequency of the sine wave created by the digital sine wave generator 602. In one embodiment, the DAC clock is derived from the same clock used to generate the photodetector sampling clock, as will be discussed in greater detail below. The DAC generated sine wave, with voltage quantization defined by the bit depth of the DAC and time quantization defined by DAC clock rate, is then passed through the filter 606. The filter 606 is preferably a low pass, analog filter. A low pass filter preserves the desired sine wave frequency while rejecting the frequencies generated by the DAC switching frequency. In one embodiment, the filter 606 comprises a $5^{th}$ order Chebyshev filter. The filtered output, now comprised almost entirely of the desired frequency, is passed to the comparator 608 to generate a square wave clock with a frequency that is independent of the clock used to drive the DAC 604.

In some embodiments it is desirable to generate the bias modulation clock at twice the necessary frequency so that only the rising edges need to be used to generate the bias modulation signal, removing any requirements on the duty cycle of the comparator output. Thus, a highly tunable clock can be generated, which is stable and frequency limited by the speed of available components.

Additionally, because the bias modulation signal itself requires a relatively low frequency, the DDS-based modulator clock generator 600 can be implemented with relatively low frequency electronic components. This facilitates the use of radiation hardened electronic components that are typically available at much lower performance levels than non-radiation hardened components. For example, for a fiber coil length of about 1 km, the proper frequency is near 100 kHz, and the desired DDS frequency is double the proper frequency, ~200 kHz. If the primary clock in the IFOG is a radiation-hardened 30 MHz fixed-frequency crystal oscillator, it can be divided by 20 with a counter to generate a 1.5 MHz clock for a radiation-hardened DAC. The 1 MHz DAC is faster than the DDS requirement that the DAC frequency be at least four times faster than the proper frequency. The resultant ~200 kHz clock is highly tunable and asynchronous to the 30 MHz fixed-frequency clock used to generate the sine wave. It should be noted that radiation-hardened DACs at such a speed are available, and the entire circuit can thus be implemented with radiation-hardened electronics.

Turning now to FIG. 7, an embodiment of a high speed sampling clock generator 700 is illustrated. In this illustrated embodiment, the sampling clock generator 700 comprises a fixed high speed clock 702 and a frequency divider 704. The fixed high speed clock 702 can comprise any suitable clock, such as a crystal oscillator that provides the main fixed clock on the fiber optic gyroscope. The sampling clock is thus generated by dividing down a fixed-frequency high speed clock. A fixed frequency clock can be used, since there are typically no requirements for tunability of the sampling clock. As one specific example, suppose the maximum sampling frequency of the analog to digital converter is 6 MHz and the crystal oscillator frequency is 30 MHz, then the 6 MHz photodetector sampling clock would be generated by using a counter to divide the 30 MHz clock by 5. The same high-speed crystal oscillator clock can be used by the bias modulation clock generator to generate the bias modulation signal. For example, the same fixed frequency clock can be divided down to the maximum conversion frequency of the digital-to-analog converter used to generate the bias modulation clock, and can be divided down to the maximum sampling frequency of the analog-to-digital converter used to sample the photodetector signal.

To best demodulate the photodetector signal, the photodetector samples are preferably aligned with the edges of the bias modulation signal. In this clock system the bias modulation clock edges are asynchronous to the photodetector sampling clock edges. To facilitate alignment, the bias modulation clock is sampled with the high-speed fixed frequency oscillator clock to locate clock transitions in the bias modulation clock. In the embodiment where the bias modulation clock is generated at twice the bias modulation frequency, only a rising edge transition needs to be identified, and the method is immune to any duty cycle requirements on the bias modulation clock.

Thus, during operation the bias modulation clock is sampled with the high speed fixed clock. When a clock transition is detected in the bias modulation clock, the sampling clock is started and first photodetector sample is taken within the coil loop transit time. Typically, the sampling clock can be started within a few high speed clock cycles. Thus, although the bias modulation clock and sampling clock are asynchronous, this facilitates sufficient alignment of the sampling clock with the bias modulation clock. Subsequent photodetector samples are then taken based on the derived fixed frequency clock. When a predetermined number of photodetector samples have been taken, no further measurements are made until the next transition on the DDS generated clock.

Figure 8:
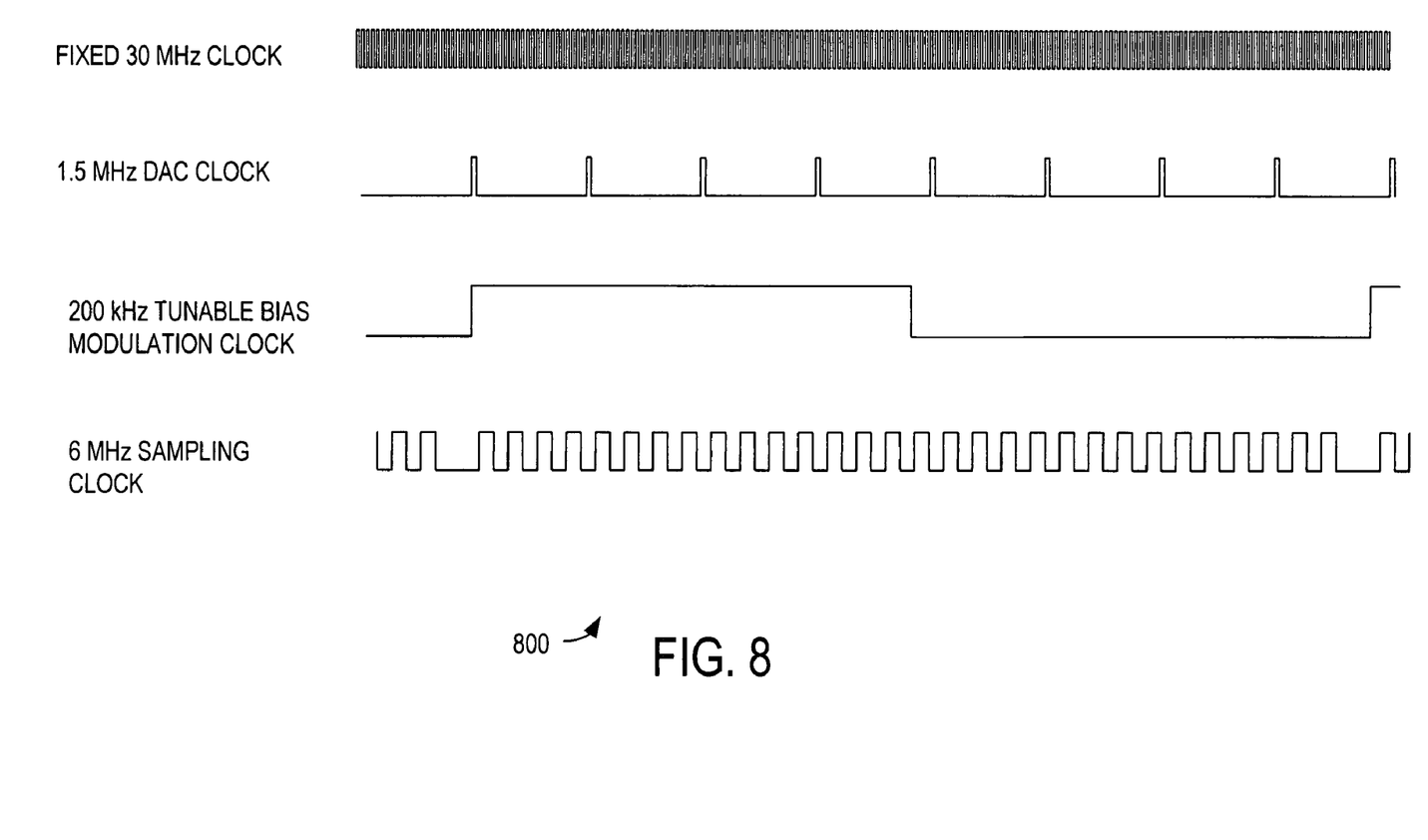
FIG. 8 is a graphical view of an exemplary timing diagram.

Turning now to FIG. 8, an illustrative example of the clocking system operation is illustrated in graph 800. Graph 800 illustrates an exemplary high-speed fixed-frequency crystal oscillator clock at 30 MHz, the 1.5 MHz clock used to generate the digital sine wave in the DDS bias modulation clock circuit, the resultant tunable bias modulation generated clock at 200 kHz, and the photodetector sampling clock at 6 MHz closely aligned to the rising edge of the bias modulation clock. In this example there are 30 photodetector samples per bias modulation transition, and no more samples are taken until the next bias modulation transition.

One consequence of asynchronously clocking the bias modulation and the photodetector sampling is a timing jitter of the photodetector samples relative to the bias modulation transition edge. This timing jitter is determined by the frequency of the clock used to recognize the transition of the bias modulation clock. In the provided embodiment, this timing jitter is 30 MHz. Anti-aliasing filters are required on the photodetector signal to prevent high frequency noise from aliasing to the demodulation frequency. The frequency of the anti-aliasing filters are typically set to half of the photodetector sampling frequency. In the provided embodiment, the photodetector sampling frequency is 6 MHz and the anti-aliasing filters are set to 3 MHz. As a consequence of the anti-aliasing filters at 3 MHz, the error incurred by the 30 MHz timing jitter is minimal.

The present invention thus provides a clock system and method for a fiber optic gyroscope that includes a highly-tunable clock for the bias modulation and a separate high-speed clock for the photodetector sampling. By separating the two clocks rather than using two derivatives of the same clock, the clock system and method can provide both the tunability objective of the bias modulation clock and the high-speed objective of the sampling clock, while using readily available, lower performance, radiation-hardened electronics parts.

The embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit of the forthcoming claims.

The invention claimed is:

1. A clock system for a fiber optic gyroscope, the fiber optic gyroscope including an optical path having a transit time, the clock system comprising:
   a bias modulation clock generator, the bias modulation clock generator generating a frequency tunable bias modulation clock signal; and
   a sampling clock generator, the sampling clock generator generating a sampling clock signal asynchronous with respect to the bias modulation clock signal, wherein the sampling clock generator generates a first sampling clock cycle in a bias modulation clock signal period in response to a transition in the bias modulation clock signal.

2. The clock system of claim 1 wherein the first sampling clock cycle is generated within the transit time of the transition in the bias modulation clock signal.

3. The clock system of claim 1 wherein the sampling clock generator further generates a predetermined additional number of sampling clock cycles within the bias clock signal period after the first sampling clock cycle.

4. The clock system of claim 1 wherein the sampling clock generator further samples the bias modulation clock signal is with a relatively high frequency clock signal to locate the transitions in the bias modulation clock signal.

5. The clock system of claim 1 wherein the sampling clock generator comprises a fixed clock and frequency divider, the fixed clock outputting a relatively high frequency clock signal and the frequency divider dividing the relatively high frequency clock to generate the sampling clock signal separate from the bias modulation clock signal.

6. The clock system of claim 1 wherein the bias modulation clock generator comprises direct digital synthesis circuit.

7. The clock system of claim 1 wherein the direct digital synthesis circuit comprises a digital sine wave generator, the digital sine wave generator creating a digital sine wave approximation having a controllable period, a digital-to-analog converter, the digital-to-analog converter receiving the digital sine wave approximation and outputting an analog sine wave signal, an analog filter to filter the analog sine wave signal, and a comparator, the comparator receiving the filtered analog sine wave signal and outputting the bias modulation clock signal.

8. The clock system of claim 7 wherein the digital sine wave generator, digital-to-analog converter, analog filter, comparator, fixed clock and frequency divider each comprise radiation-hardened components.

9. The clock system of claim 7 wherein the digital-to-analog converter further receives a digital-to-analog converter clock, and wherein the digital-to-analog converter clock is generated by dividing down a relatively high frequency clock signal.

10. A clock system for a fiber optic gyroscope, the fiber optic gyroscope including an optical path having a transit time, the clock system comprising:
a bias modulation clock generator, the bias modulation clock generator generating a frequency tunable bias modulation clock signal; and
a sampling clock generator, the sampling clock generator generating a sampling clock signal asynchronous with respect to the bias modulation clock signal, wherein the sampling clock generator generates a first sampling clock cycle after a transition in the bias modulation clock signal, and wherein the sampling clock generator further generates a predetermined additional number of sampling clock cycles within the bias clock signal period after the first sampling clock cycle.

11. The clock system of claim 10 wherein the sampling clock generator samples the bias modulation clock signal with a relatively high frequency clock signal to locate the transitions in the bias modulation clock signal.

12. The clock system of claim 10 wherein the sampling clock generator comprises a fixed clock and frequency divider, the fixed clock outputting a relatively high frequency clock signal and the frequency divider dividing the relatively high frequency clock to generate the sampling clock signal separate from the bias modulation clock signal.

13. The clock system of claim 10 wherein the bias modulation clock generator comprises direct digital synthesis circuit.

14. The clock system of claim 13 wherein the direct digital synthesis circuit comprises a digital sine wave generator, the digital sine wave generator creating a digital sine wave approximation having a controllable period, a digital-to-analog converter, the digital-to-analog converter receiving the digital sine wave approximation and outputting an analog sine wave signal, and a comparator, the comparator receiving the analog sine wave signal and outputting the bias modulation clock signal.

15. The clock system of claim 14 wherein the digital sine wave generator, digital-to-analog converter, comparator, fixed clock and frequency divider each comprise radiation-hardened components.

16. The clock system of claim 15 wherein the digital-to-analog converter further receives a digital-to-analog converter clock, and wherein the digital-to-analog converter clock is generated by dividing down a relatively high frequency clock signal.

17. A clock system for a fiber optic gyroscope, the fiber optic gyroscope including an optical path having a transit time, the clock system comprising:
a bias modulation clock generator, the bias modulation clock generator comprising:
a digital sine wave generator, the digital sine wave generator creating a digital sine wave approximation having a controllable period;
a digital-to-analog converter, the digital-to-analog converter receiving the digital sine wave approximation and outputting an analog sine wave signal;
a comparator, the comparator receiving the analog sine wave signal and outputting a bias modulation clock signal; and
a sampling clock generator, the sampling clock generator comprising a fixed clock and frequency divider, the fixed clock outputting a relatively high frequency clock signal and the frequency divider dividing the relatively high free clock to generate a sampling clock signal asynchronous with respect to the bias modulation clock signal, wherein the sampling clock generator generates a first sampling clock cycle in a bias modulation clock signal period in response to a transition in the bias modulation clock signal, and wherein the first sampling clock cycle is generated within the transit time of the transition in the bias modulation clock signal, and wherein the sampling clock generator further generates a predetermined additional number of sampling clock cycles within the bias clock signal period after the first sampling clock cycle.

18. The clock system of claim 17 wherein the sampling clock generator samples the bias modulation clock signal with the relatively high frequency clock signal to locate the transitions in the bias modulation clock signal.

19. The clock system of claim 17 wherein the digital sine wave generator, digital-to-analog converter, and comparator are implemented in a direct digital synthesis circuit and wherein the digital sine wave generator, digital-to-analog converter, comparator, fixed clock and frequency divider each comprise radiation-hardened components.

* * * * *

UNITED STATES PATENT AND TRADEMARK OFFICE
CERTIFICATE OF CORRECTION

PATENT NO. : 7,333,209 B2  Page 1 of 1
APPLICATION NO. : 11/271994
DATED : February 19, 2008
INVENTOR(S) : Greening et al.

It is certified that error appears in the above-identified patent and that said Letters Patent is hereby corrected as shown below:

Col. 11 line 13
In Claim 4 the word "is" should be deleted

Signed and Sealed this

Twenty-third Day of September, 2008

JON W. DUDAS
*Director of the United States Patent and Trademark Office*